Dec. 16, 1952 R. T. CLAYDEN 2,622,193

ELECTRONIC SWITCHING CIRCUITS

Filed Aug. 28, 1950

Inventor
RONALD THOMAS CLAYDEN
By Ralph E. Atherton
Attorney

Patented Dec. 16, 1952 2,622,193

UNITED STATES PATENT OFFICE 2,622,193

ELECTRONIC SWITCHING CIRCUITS

Ronald Thomas Clayden, East Sheen, London, England, assignor to Electric & Musical Industries Limited, Hayes, England, a company of Great Britain Application August 28, 1950, Serial No. 181,748
In Great Britain September 3, 1949

8 Claims. (Cl. 250—27)

Figure 1:
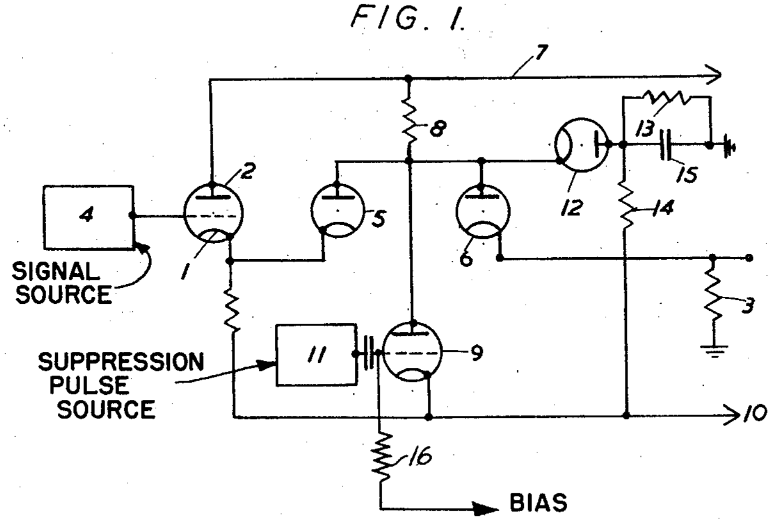

This invention relates to electronic switching circuits.

Electronic switching circuits are frequently employed to control the transmission of electrical signals, e. g. television picture signals, through a signal channel. One form of such circuit comprises two thermionic valves which are coupled together by an impedance connected at one end to an electrode of each of said valves and earthed at its other end, one of said valves being connected in a signal transmission channel and means being provided for applying switching potentials to the second valve so that the latter can be switched on or off, the arrangement being such that said first-mentioned valve is switched on to permit the transmission of signals via said channel when the other of said valves is switched off, and vice-versa. One application of a switching circuit of this form is described in United States co-pending patent application Serial No. 113,300, filed August 31, 1949, by E. L. C. White. Such switching circuits have however, the disadvantage that when the first valve is switched off so as to discontinue the transmission of signals via said channel, high frequency signals are liable to be transmitted through the stray capacity associated with said first valve, especially if the latter is a diode, as in the case of the application described in the above-mentioned specification.

A similar disadvantage may arise with other forms of electronic switching circuits employing thermionic valves and the main object of the present invention is to mitigate the aforesaid disadvantage.

According to the present invention there is provided a switching circuit comprising a thermionic valve arranged to be effectively in series in a signal transmission channel, and means for switching said valve on or off, said means being such that, when said valve is switched off, a path is presented from said channel to earth which is of low impedance compared with the impedance of stray capacity effective in said channel due to said valve, whereby signals which would otherwise be transmitted through said stray capacity are substantially attenuated, whereas when said valve is switched on the impedance of said path is increased.

A further disadvantage arising in a switching circuit of the form described in the second paragraph of the specification is that the potential excursion at the electrodes connected to said coupling impedance, occurring when the second valve is switched on and which is effective in switching off the first valve, is liable to be transmitted to the output of the circuit via the stray capacity of the first valve.

According to a feature of the present invention, which has the object of reducing this disadvantage when the switching circuit is of said form, the circuit is so arranged that when the potential at the electrodes connected to said coupling impedance is varied by switching off said second valve, said change is prevented from exceeding a limit which is just sufficient to switch off said first valve.

In order that the said invention may be clearly understood and readily carried into effect, the same will now be more fully described with reference to the accompanying drawings.

Figure 2:
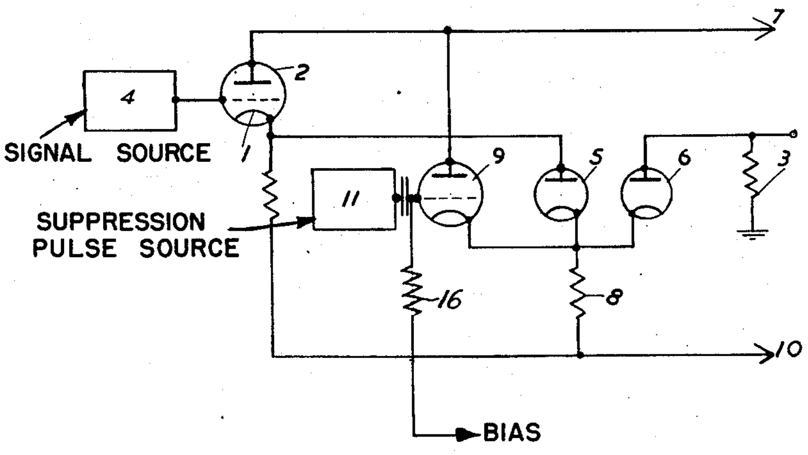

Figure 1 illustrates one example of a switching circuit in accordance with the present invention, and Figure 2 illustrates a modification thereof.

Referring to the drawing the switching circuit illustrated in Figure 1 is arranged to control the transmission of signals from the cathode 1 of a cathode follower valve 2 to a load resistance 3. It will be assumed that the aforesaid signals comprise television video signals which are fed to the control electrode of the valve 2 from the video signal channel of television transmitting equipment, said channel being represented in block form at 4. The video signals from the channel 4 have their D. C. component established in such a way that signals representing black have a potential of substantially zero volts at the cathode 1, while an increase in brightness is represented by a positive potential excursion at said cathode. The switching circuit serves to insert suppression intervals in said video signals, that is to say intervals during which no signals are received by the resistance 3 from the cathode 1. The switching circuit comprises two unilaterally conductive devices in the form of diode valves 5 and 6 having their cathodes connected respectively to the cathode 1 and to one end of the resistance 3, the other end of the latter being earthed. The anodes of the diodes 5 and 6 are interconnected and connected to a source of positive potential represented by the line 7 by means of resistance 8. The anodes of the diode valves 5 and 6 are also connected to the anode of a triode valve 9 whose cathode is connected to a suitable source of negative potential represented by the line 10. The control electrode of the valve 9 is connected to a source of positive potential pulses indicated in block form at 11, and is so biassed, via resistance 16 as indicated in the drawing, that the valve 9 is maintained normally non-conducting. The pulses from 11 which are referred to hereinafter as suppression pulses are arranged to be of such amplitude that the valve 9 is switched on for the duration of each pulse. The anodes of the valves 5 and 6 are also connected to the cathode of a further diode valve 12 whose anode is connected to the junction of potential dividing resistances 13 and 14 connected between earth and the negative potential source 10, the junction of 13 and 14 being also connected to earth by a large condenser 15. The anode of the valve 12 is thus in effect connected to a low impedance source of potential set up at the junction of 13 and 14.

When the valve 9 is non-conducting, that is in the intervals between the suppression pulses, the diode valves 5 and 6 are maintained conducting and the signals set up at the cathode 1 are transmitted to the resistance 3 with but little attenuation. The potential applied to the anode of the valve 12 is arranged to be such that this valve is maintained non-conducting when the valve 9 is non-conducting even at the lowest level of signal likely to be transmitted between the cathode 1 and the resistance 3. Valve 12 is, therefore, substantially ineffective in the circuit since the impedance of the stray capacity between its anode and cathode is large compared with the impedance of the diode 5 when conducting at least over the operating frequency range. When a suppression pulse is fed to the control electrode of the valve 9 this valve is switched on and the circuit parameters are such that the potential at its anode falls below earth potential, switching off the diode valves 5 and 6. The potential to which the anode of 9 falls is moreover, arranged to be sufficiently below earth potential to render the valve 12 conducting. The latter then presents an impedance from the anode of 5 to ground effectively shunting the coupling resistance 8 and which over the operating frequency range is low compared with the impedance of the stray anode-cathode capacity associated with the valve 5. The valve 12 therefore, by reducing the coupling between the cathode of the valve 1 and the resistance 3, effectively short-circuits to ground any high frequency signals which might otherwise be transmitted to the resistance 3 from the cathode 1 due to the stray anode-to-cathode capacity of the diode valves 5 and 6 in series.

It will also be appreciated that the diode valve 12 effectively limits the potential to which the anode of the valve 9 falls when it is switched on and the resistances 13 and 14 are so chosen that said fall is only enough to ensure that the diode valve 6 is switched off, the said potential being arranged to be only a few volts, say 2 volts, below the cut off level. In this way the negative potential excursion which is liable to be fed via the stray anode-to-cathode capacity of the valve 6 to the resistance 3, when the valve 6 is switched off, is limited to a minimum amplitude.

In the modification which is illustrated in Figure 2 the valve 12 is dispensed with and its function is performed by the valve 9. The diode valves 5 and 6 have their polarity reversed as compared with the diodes in Figure 1 so that their anodes are connected respectively to the cathode 1 and the resistance 3 while their cathodes are connected to the resistance 8 which in this case is taken to the negative potential source 10. Moreover, the signals fed from the channel 4 to the valve 2 are arranged to be such that an increase in picture brightness is represented by negative excursion at the cathode 1, the D. C. component being, as in Figure 1, established so that picture black is represented by signals of substantially zero volts at said cathode. The valve 9 has its cathode connected to the anodes of 5 and 6 and has its anode connected to the positive potential supply 7, its control electrode, as before, being connected to the source of suppression pulses 11. The value of the resistance 8 is large compared with the reciprocal of the cathode mutual conductance of the valve 9 so that this valve when conducting operates as a cathode follower. In the intervals when the valve 9 is non-conducting, the circuit operates effectively in the same way as that illustrated in Figure 1. When a suppression pulse occurs and the valve 9 is switched on the potential at the cathodes of the valves 5 and 6 is raised sufficiently to cut-off the latter valves, thus discontinuing the signal transmission from the cathode 1 to the resistance 3. However when the valve 9 conducts, since it operates as a cathode follower, it reduces in known manner the effective value of the coupling resistance 8 and presents an impedance from its cathode effectively to ground which impedance is low compared with the impedance of the stray anode-cathode capacity of the diode valve 5 in the operating frequency range, and the transmission of high frequency signals between the cathode 1 and the resistance 3 due to the stray anode-to-cathode capacities of 5 and 6 in series is therefore maintained at a low value. In this modification the amplitude of the potential excursion set up at the cathode of the diode valve 6 when it is switched off, is reduced to a minimum by suitably biassing the valve 9.

In the circuits illustrated in Figures 1 and 2 the diode valve 5 can be dispensed with if the signal is fed into the switching circuit from a reasonably high impedance source or from a source of limited current capacity. For instance, if the diode 5 is omitted in the circuit illustrated in Figure 2, when the valve 9 is non-conducting the operation of the circuit is substantially the same as described above. However, when the valve 9 is switched on, it raises not only the potential at the cathode of the diode 6 but also the potential at the cathode 1, thereby not only cutting off the diode 6 but tending to cut-off the cathode follower valve 2, thus further reducing the liability for unwanted signal transmission to the resistance 3 in addition to its effect in presenting a low impedance from the cathode of the valve 5 to ground.

Although the invention has been described above in relation to switching circuits for controlling the transmission of television video signals it will be understood that the invention is not limited to this application but is capable of general application. Other modifications are also possible in the circuits illustrated. For example the valve 12 may be replaced by a metal rectifier.

What I claim is:

1. An electronic switching circuit for controlling the transmission of electrical signals from a signal source to an output load, comprising a coupling impedance fed with signals from said source, a normally conducting unilaterally conductive device connected in series with and between said coupling impedance and said load, and means for selectively feeding direct current through said coupling impedance to bias said device to cut-off and thereby discontinue signal transmission from said source to said load, said means including a second unilaterally conductive device connected to provide a low impedance path shunting said coupling impedance with the cutting off of said first device, said path being of low impedance compared with the impedance of stray capacity of said first device to reduce capacity coupling between said source and said load when said first device is cut off.

2. A circuit according to claim 1, said second unilaterally conductive device being connected to limit the cut-off bias for said first unilaterally conductive device to the minimum just sufficient to cut off said first device.

3. An electronic switching circuit for controlling the transmission of electrical signals from a signal source to an output load, comprising a coupling impedance fed with signals from said source, a normally conducting unilaterally conductive device connected in series with and between said coupling impedance and said load, a second unilaterally conductive device paralleled with said first device in series with said coupling impedance, means biassing said second device to a state of low conductivity, means for switching said second device to a state of high conductivity to feed current through said coupling impedance for biassing said first device to cut-off and thereby discontinue signal transmission from said source to said load, and a third unilaterally conductive device connected to change from a high impedance state to a low impedance state with the cutting off of said first device, said third device in its low impedance state providing a path shunting said coupling impedance of low impedance compared with the impedance of stray capacity of said first device to reduce capacity coupling between said source and said load when said first device is cut off.

4. An electronic switching circuit for controlling the transmission of electrical signals from a signal source to an output load, comprising a coupling impedance fed with signals from said source, a unilaterally conductive device having at least an anode and a cathode connected in series with and between said impedance and said load with its cathode connected to one end of said impedance, a thermionic valve having at least an anode, a control electrode and a cathode connected as a cathode follower with said coupling impedance in its cathode lead, the cathode of said valve being connected to said end of said coupling impedance, means normally biassing said valve to cut-off, and means for selectively switching on said valve to feed current through said coupling impedance for biassing said unilaterally conductive device to cut-off and thereby discontinue the signal transmission from said source to said load, the cathode follower action of said valve effectively reducing the value of said coupling impedance to a low value compared with the impedance of stray capacity of said unilaterally conductive device to reduce capacity coupling between said source and said load when said first device is cut off.

5. In a signal transmission channel, a switching circuit comprising a unilaterally conductive device connected in series with said channel and means for switching said device selectively to a nonconducting or conducting state, said switching means including an impedance, and means connecting said impedance as a shunt to said channel responsive to the operation of said switching means to have a high impedance in the conducting state of said unilaterally conductive device and to have a low impedance in the nonconducting state of said device for attenuating signals which would otherwise be transmitted via self or stray capacity associated with said device.

6. A circuit according to claim 5, said unilaterally conductive device comprising a thermionic valve and said switching means comprising a second thermionic valve and an impedance coupling said valves in such manner that when the first valve is conducting and the second valve is nonconducting, and vice versa, said coupling impedance being connected from an electrode of each of said valves to earth and shunting said first-mentioned impedance.

7. A circuit according to claim 6, said coupling impedance being connected in the cathode lead of said second valve to cause said second valve to operate as a cathode follower valve, whereby said second valve constitutes the first-mentioned impedance.

8. A circuit according to claim 6, said first-mentioned impedance comprising a third thermionic valve.

RONALD THOMAS CLAYDEN.

REFERENCES CITED

The following references are of record in the file of this patent:

UNITED STATES PATENTS

| Number | Name | Date |
|---|---|---|
| 2,466,959 | Moore | Apr. 12, 1949 |
| 2,535,912 | Frank et al. | Dec. 26, 1950 |
| 2,570,431 | Crosby | Oct. 9, 1951 |